Patented Dec. 12, 1933

UNITED STATES PATENT OFFICE

1,938,993

VAT DYESTUFFS OF THE ANTHRAQUINONE SERIES

Otto Bayer, Frankfort-on-the-Main, Germany, assignor to General Aniline Works, Inc., New York, N. Y., a corporation of Delaware No Drawing. Application March 7, 1932, Serial No. 597,429, and in Germany March 12, 1931

3 Claims. (Cl. 260—60)

The present invention relates to vat dyestuffs of the anthraquinone series.

In accordance with the invention new vat dyestuffs of the anthraquinone series are prepared by causing one molecular proportion of a meta- or para-diphenylbenzene dicarboxylic acid or a substitution product thereof, or, more advantageously, of a functional derivative of these compounds (the halides, for example) to react on two molecular proportions of alpha-aminoanthraquinone or a substitution product thereof. Suitable substituted alpha-aminoanthraquinones are, for example, those, as are substituted in the nucleus by halogen (chlorine, bromine etc.), aroylamino groups (benzoylamino-, meta-, methoxy - benzolyamino-, chlorobenzoylamino-, naphthoylamino groups etc.) or alkoxy groups (methoxy, ethoxy etc.)

The reaction is advantageously performed while heating the reaction components in the presence of a high boiling organic solvent being inert to the starting materials, such as chlorobenzene, ortho-dichlorobenzene, nitrobenzene etc.

The diphenylbenzene dicarboxylic acids in question can be prepared, for example, by reacting upon meta- or para-diphenylbenzene with acetylchloride according to the Friedel-Craft's reaction and oxidizing the reaction products with chromic acid in glacial acetic acid. The halides can be prepared from the dicarboxylic acid thus obtained according to one of the methods generally applied in the manufacture of carboxylic acid halides from carboxylic acids.

The new dyestuffs probably correspond to the general formula:—

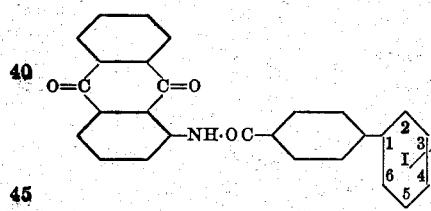

wherein the various nuclei may be substituted by monovalent substituents and wherein the benzene nucleus marked II is attached to the benzene nucleus marked I in the 3- or 4-position.

They form yellow to bluish-red powders difficultly soluble in the usual organic solvents, soluble in concentrated sulfuric acid with a yellow coloration, dyeing cotton from an alkaline hydrosulfite vat yellow to bluish red shades of good fastness properties. The new dyestuffs are generally distinguished from the known dyestuffs of similar structure by a better capacity of being absorbed by the fibre, by improved dyeing power and by the fact that they are fast to kier boiling.

The following examples illustrate the invention, without, however, limiting it thereto:—

Example 1

30 kgs. of para-para-diphenylbenzene-dicarboxylic acid are heated to boiling in about 500 kgs. of ortho-dichlorobenzene with 35 kgs. of thionylchloride, until complete solution has been brought about. Then, advantageously after distilling off the excess of thionylchloride, 46 kgs. of alpha-aminoanthraquinone are added and the whole is heated to boiling for about 2 hours, until the evolution of hydrochloric acid has ceased. The dyestuff, which separates in yellow crystals, is filtered off while hot and washed with alcohol. It dyes a clear and powerful greenish-yellow shade of excellent fastness properties and very satisfactory affinity for the fibre from a hot or cold bordeaux-red colored vat.

Example 2

When in Example 1 the para-para-diphenylbenzene dicarboxylic acid chloride is replaced by an equal quantity of 1.3-diphenylbenzene-dicarboxylic acid chloride a very similar dyestuff is produced, which dyes a somewhat more greenish yellow shade than that of Example 1.

When instead of the alpha-aminoanthraquinone derivatives thereof are employed, such as for example, 6-chloro-1-aminoanthraquinone, 1-amino-4- or -5-benzoylaminoanthraquinone or 1-amino-4-methoxy-anthraquinone valuable dyestuffs are likewise obtained.

I claim:—

1. The compounds of the probable formula:—

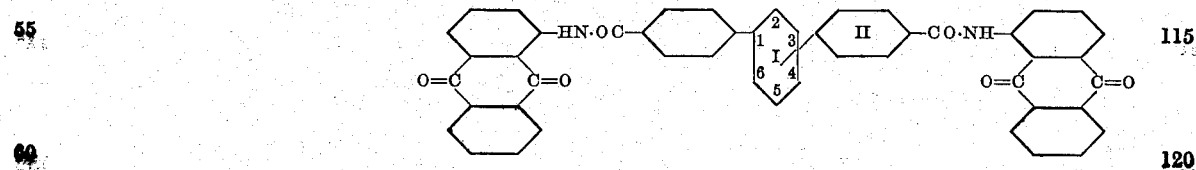

wherein the anthraquinone nuclei may be substituted by halogen atoms, aroylamino- or alkoxy groups and wherein the benzene nucleus marked II is attached to the benzene nucleus marked I in the 3- or 4-position, said compounds forming yellow to bluish-red powders difficultly soluble in the usual organic solvents, soluble in concentrated sulfuric acid with a yellow coloration, dyeing cotton from an alkaline hydrosulfite vat clear and strong yellow to bluish-red shades of good fastness properties.

2. The compounds of the formula:—

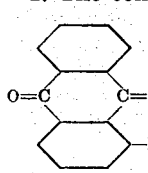

wherein the benzene nucleus marked II is attached to the benzene nucleus marked I in the 3- or 4-position, said compounds forming yellow crystals, dyeing cotton strong yellow shades of excellent fastness properties.

3. A compound of the formula:

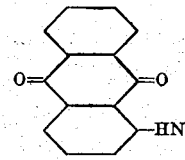
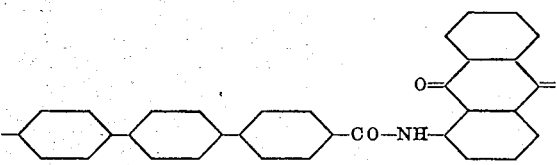

said compound forming yellow crystals dyeing cotton from a bordeaux red colored vat greenish-yellow shades of an excellent fastness and a satisfactory affinity to the fiber.

OTTO BAYER.